(12) United States Patent
Charlton et al.

(10) Patent No.: US 8,671,975 B2
(45) Date of Patent: Mar. 18, 2014

(54) COMPLIANT-SEAL CHECK VALVE

(75) Inventors: Christopher B. Charlton, Benicia, CA (US); Geoff C. Gerhardt, Millbury, MA (US); Theodore Dourdeville, Marion, MA (US)

(73) Assignee: Waters Technologies Corporation, Milford, MA (US)

( * ) Notice: Subject to any disclaimer, the term of this patent is extended or adjusted under 35 U.S.C. 154(b) by 844 days.

(21) Appl. No.: 12/374,417

(22) PCT Filed: Jul. 25, 2007

(86) PCT No.: PCT/US2007/074294
§ 371 (c)(1),
(2), (4) Date: Nov. 20, 2009

(87) PCT Pub. No.: WO2008/014306
PCT Pub. Date: Jan. 31, 2008

(65) Prior Publication Data
US 2010/0158704 A1 Jun. 24, 2010

Related U.S. Application Data

(60) Provisional application No. 60/820,267, filed on Jul. 25, 2006.

(51) Int. Cl.
*F16K 15/18* (2006.01)
(52) U.S. Cl.
USPC ........................ 137/522; 137/538; 251/129.01
(58) Field of Classification Search
CPC ... F16K 15/021; F16K 15/18; F16K 31/0644; F16K 31/0648; F16K 31/0655; F16K 31/0658; F04B 15/1032
USPC .............. 137/469, 522, 523, 538; 251/82, 83, 251/129.01
See application file for complete search history.

(56) References Cited

U.S. PATENT DOCUMENTS 2,225,586 A * 12/1940 Dillman ......................... 251/83
3,421,546 A * 1/1969 Jennings et al. .............. 137/523
(Continued)

FOREIGN PATENT DOCUMENTS

| JP | 58156783 | 9/1983 |
| JP | 61174669 | 10/1986 |
| JP | 36171 | 1/1991 |
| JP | 2001235052 | 8/2001 |

OTHER PUBLICATIONS

Japanese Translation of Notice of Rejection for Japanese Patent Application No. 2009-521973, dated Nov. 4, 2011, 7 pages.

(Continued)

*Primary Examiner* — John Rivell
(74) *Attorney, Agent, or Firm* — Waters Technologies Corp.

(57) ABSTRACT

A check valve includes a valve seat and a compliant member that moves to seal the check valve by contacting the valve seat. A method for priming a chromatography solvent pump includes providing the check valve in fluid communication with an outlet of the pump, drawing fluid into the pump from a fluid source, and expelling the fluid from the pump through the valve, thus wetting the check valve. Another method for priming a chromatography solvent pump includes providing the check valve in fluid communication with an inlet of the pump, drawing fluid through the valve into the pump, and expelling the fluid from the pump.

16 Claims, 5 Drawing Sheets

(56) References Cited

U.S. PATENT DOCUMENTS

| | | | |
|---|---|---|---|
| 3,810,716 A | | 5/1974 | Abrahams et al. |
| 3,855,129 A | | 12/1974 | Abrahams et al. |
| 4,245,963 A | | 1/1981 | Hutchins et al. |
| 4,252,094 A | * | 2/1981 | Draxler .................... 137/523 |
| 4,412,792 A | | 11/1983 | LaBorde et al. |
| 4,504,081 A | | 3/1985 | Shimizu et al. |
| 4,681,139 A | | 7/1987 | Falconer |
| 4,846,218 A | | 7/1989 | Upchurch |
| 4,974,628 A | | 12/1990 | Tepermeister et al. |
| 5,173,188 A | * | 12/1992 | Winter et al. ............... 210/634 |
| 5,487,407 A | * | 1/1996 | Eaker ........................ 137/522 |
| 5,636,975 A | * | 6/1997 | Tiffany et al. .............. 417/454 |
| 5,862,832 A | | 1/1999 | Victor et al. |
| 5,940,788 A | * | 8/1999 | Morman et al. ............. 702/138 |
| 5,964,416 A | | 10/1999 | Jaeger et al. |
| 6,168,400 B1 | | 1/2001 | Van Davelaar |
| 6,200,113 B1 | | 3/2001 | Van Davelaar |
| 6,427,970 B1 | | 8/2002 | Silva |
| 6,780,315 B2 | * | 8/2004 | Richardson et al. ....... 210/198.2 |
| 2003/0047216 A1 | | 3/2003 | Kelly |

OTHER PUBLICATIONS

PCT International Search Report for Application No. PCT/Us07/74294, Forms PCT/ISA/220 + 210, dated May 23, 2008.
PCT International Written Opinion Report for Application No. PCT/US07/74294, Forms PCT/ISA/23, dated May 13, 2008, 7 pages.

* cited by examiner

COMPLIANT-SEAL CHECK VALVE

CROSS REFERENCE TO RELATED APPLICATIONS

This application claims benefit of and priority to U.S. Provisional Patent Application No. 60/820,267, filed Jul. 25, 2006, the entire contents of which is incorporated herein by reference.

TECHNICAL FIELD

The invention relates to fluid flow-control valves, and, in particular, to check valves used in chemical processing instruments.

BACKGROUND INFORMATION

Instruments used in analytical and preparative chemistry often include valves to control the flow of fluids. Check valves are one important class of flow-control valves, and are typically utilized to permit fluid flow in one direction, while impeding fluid flow in the reverse direction. Liquid chromatographs, for example, typically include check valves in fluid communication with respective inlet and outlet ports of a displacement pump to control the direction of fluid flow through the pump.

For example, U.S. Pat. No. 3,810,716 to Abrahams et al. ("Abrahams") illustrates inlet and outlet check valves applied to a high-pressure chromatography reciprocating two-piston pump. The pump employs an inlet and an outlet check valve respectively on each of two displacement chambers or cylinders. The pump has a "parallel" configuration, which delivers fluid to a downstream receiving system alternately from the two pump cylinders; each cylinder is in direct fluid communication with the receiving system during a portion of the pump cycle. The alternating pattern of fluid delivery allows one pump cylinder to be refilled while delivery from the other pump cylinder sustains the desired pump output flow rate to the downstream system.

The inlet and outlet check valves associated with each cylinder in this parallel configuration allow each cylinder to communicate either with an inlet fluid pathway from a solvent reservoir or with an outlet fluid pathway to the downstream receiving system. The operation and location of the check valves substantially prevents the backflow of fluid from the pressurized system into a pump cylinder that is undergoing refill at substantially atmospheric pressure.

Another common configuration of a high-pressure pump for liquid chromatography is a "serial" configuration, illustrated, for example, in U.S. Pat. No. 4,245,963 to Hutchins et al. Liquid inspired at a pump intake is directed serially through a first pump cylinder and a second pump cylinder. Only a single inlet and a single outlet check valve are utilized. The coordinated motion of respective first and second pistons interacts cooperatively with the actions of the inlet and the outlet check valves to achieve a substantially constant output flow rate of liquid to a downstream receiving system.

As with the parallel pump configuration, a single drive motor may be used to effect the coordinated motion of the two pistons, through use of appropriate gearing or equivalent drive elements. Alternatively, a separate motor may be allocated for the drive of each piston, which can allow greater operational flexibility in motion coordination.

A ball-and-seat type of chromatography-pump check valve is particularly common. A typical configuration employs a stationary seat and a ball that is capable of being displaced toward or away from the seat. In a passive ball-and-seat check valve, fluid flow in one direction urges the ball against the seat, blocking the flow of fluid. Fluid flow in the opposite direction urges the ball away from the seat, opening a pathway through the valve. Some passive check valves include a spring that holds the ball against the seat until a differential fluid pressure across the valve exceeds a threshold value as determined by the force applied by the spring.

A chromatography pump check-valve ball is commonly fabricated from ruby while a check-valve seat is commonly fabricated from sapphire (both ruby and sapphire are forms of crystalline aluminum oxide.) Alternatively, check-valve balls and seats are fabricated from, for example, aluminum-oxide based ceramics. These valve materials are chosen for a number of desired properties, for example, for their chemical inertness, resistance to wear, machineability, and/or stiffness.

Chromatography pumps are generally high-precision devices, designed to produce substantially stable and reproducible solvent flows at delivery pressures of as much as thousands of pounds per square inch (psi) or greater (i.e., tens of megaPascals or greater.) Back-leakage of a check valve can degrade or destroy the desired relationship between a control input (such as a pump step-motor step rate or step count) and a volume delivery output of chromatography solvent. Therefore, considerable effort has been expended by ball-and-seat check valve manufacturers to produce balls that are highly spherical and that have an excellent surface finish. A corresponding effort has been expended by manufacturers to produce seats having a spherical sealing surface with a close tolerance as well as an excellent surface finish.

Many existing valves, though providing a good seal when new, become fouled in service by foreign matter that lodges on either the ball or the seat sealing surface. This fouling at times is transient, where the fouling substance is swept downstream on a subsequent valve actuation, or may be more permanent, where restoration of proper valve function may require valve disassembly and aggressive cleaning, or component replacement.

While fouling matter resides on the ball or seat, the check valve may be rendered partially or wholly inoperable due to a failure to properly seal against reverse flow. In another failure mode, the ruby and sapphire materials may become stuck together in the presence of particular solvents, rendering the valve inoperable because it cannot enable fluid flow in the forward direction.

Filters of various types have been employed by chromatography pump manufacturers in attempts to eliminate at least certain classes of particulate fouling. In practice, however, an in-line solvent filtration device that could remove all or nearly all incoming particulate contamination would typically require an effective pore size so small that the pump intake could become starved.

SUMMARY

The invention arises, in part, from the realization that an effective high-pressure chromatography solvent supply check valve advantageously utilizes a compliant member that moves to contact a hard valve seat. Moreover, the compliant member is advantageously mounted to a substantially rigid moveable member. The contact interface desirably has a relatively narrow dimension and a relatively long dimension. Suitable compliant members include, for example, gaskets and O-rings. Some embodiments of the invention provide a check valve that supports priming of a fluid pump even if the check valve is initially dry.

Accordingly, one embodiment of the invention features a valve. The valve includes a valve seat and a moveable compliant member that contacts the valve seat. The valve seat defines an orifice through which fluid flows when the valve is in an opened state. When the valve is in a closed state, the compliant member contacts the valve seat to impede the fluid from flowing through the orifice. The valve optionally includes a filter unit configured to filter particles that have a size sufficient to bridge the contact interface between the valve seat and the compliant member.

In one example implementation of the valve, the valve has features similar to a ball-and-seat check valve, with, however, the ball replaced, in part, by the compliant member. The contact interface defines an aperture that surrounds the orifice in the valve seat. The compliant member, in some cases in combination with a moveable member, blocks fluid from flowing through the orifice when the valve is in a closed state. A filter is optionally configured to remove particles having a dimension similar to, or greater than, a radial width of the contact area between the compliant member and the valve seat.

In another embodiment of the invention, a method for priming a chromatographic solvent pump includes providing a check valve, such as the above-described valve, in fluid communication with an outlet of the pump, and initiating pumping by the pump while the pump and the check valve are initially dry. A solvent is thus drawn into the pump, and expelled from the pump through the check valve. The check valve thus becomes wetted.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1b is a sectioned three-dimensional view of a portion of the check valve of FIG. 1a;

DETAILED DESCRIPTION

As used herein the word "elastic" refers to an ability of a material or materials to repeatedly deform and to repeatedly return, after deformation, to a substantially original shape (excluding any plastic, i.e., substantially permanent, deformation.) According to various embodiments of the invention, the elastic properties of a material include linear and/or non-linear elastic behavior. Some embodiments of the invention utilize one or more compliant materials, which exhibit elastic and/or plastic behavior. Preferred embodiments include a compliant material(s) that is conformable to repeatedly create a hydraulic seal during repeated contact with a valve seat.

Figure 1A:
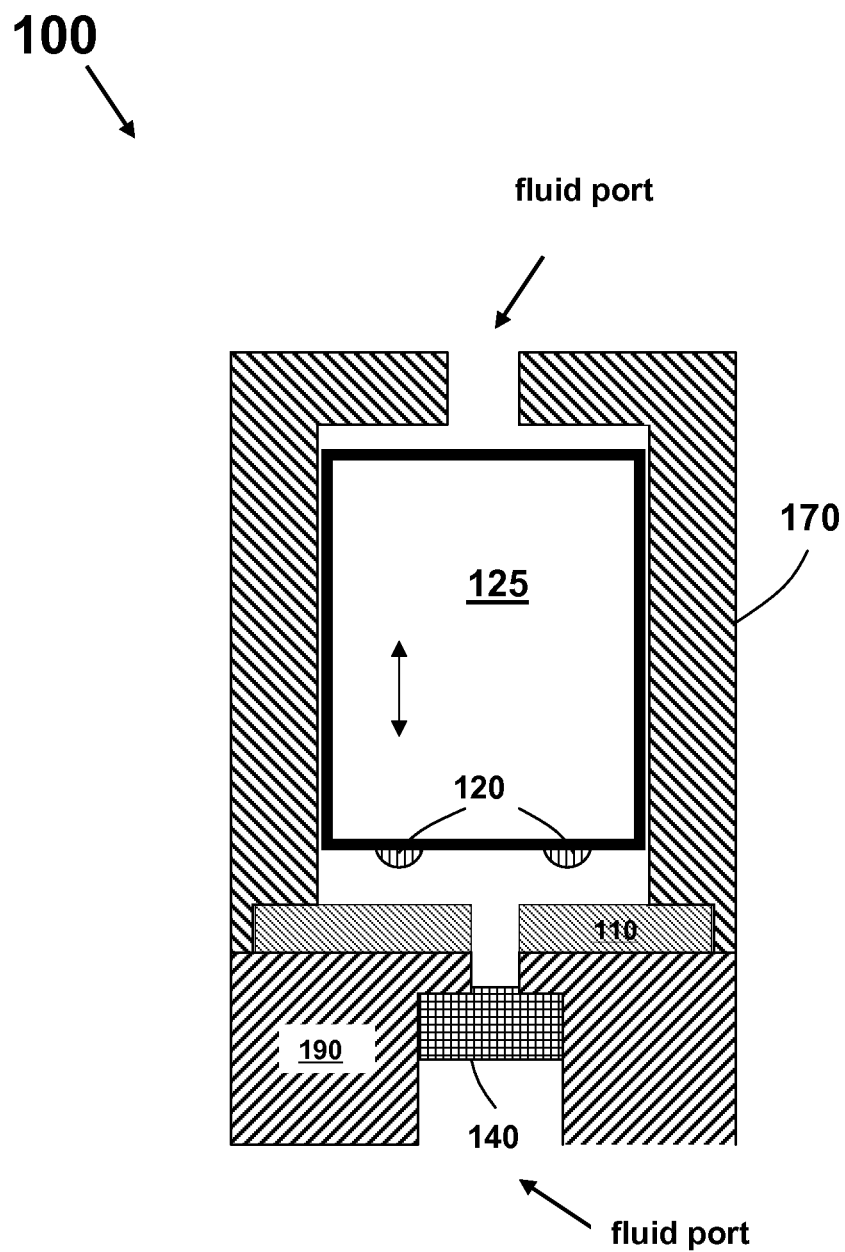
FIG. 1a is a cross-sectional diagram of a check valve, in accordance with one embodiment of the invention.

FIG. 1a illustrates a cross-sectional diagram of a check valve 100, in accordance with one embodiment of the invention. The valve 100 includes a valve seat 110, a compliant member 120, and optionally includes a filter unit 140. Also, optionally, the valve 100 includes a moveable member 125 on which the compliant member 120 is mounted, a first valve body portion 170 and a second valve body portion 190. The valve 100 also includes fluid ports to provide fluid inlet and outlet pathways for a fluid flow entering and exiting the valve 100. The valve seat 110 defines an orifice through which fluid flowing through the valve 100 passes. For some applications, the valve 100 is implemented as a passive check valve that opens and closes in response to changes in differential fluid pressure, inlet-to-outlet.

Figure 1B:
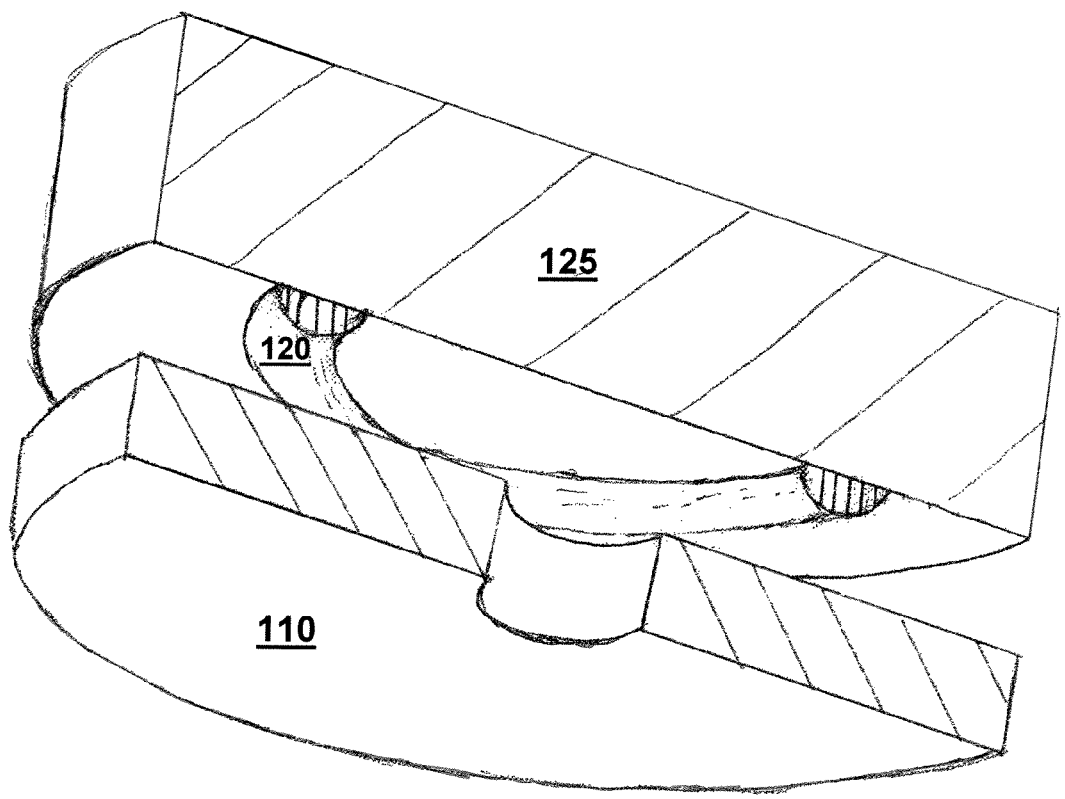

FIG. 1b illustrates a sectioned three-dimensional view of a portion of the check valve 100 including the valve seat 110, the compliant member 120, and the moveable member 125.

The fluid ports, the valve-seat orifice, the first valve body portion 170, and the moveable member define a pathway for fluid flowing through the check valve 100. Fluid flows through the valve 100, in part, via a space between the moveable member 125 and the first body portion 170.

The compliant member 120 defines an aperture that is disposed adjacent to the orifice of the valve seat 110. The moveable member 125 provides a barrier to fluid attempting to pass through the aperture of the compliant member 120. That is, fluid must flow past an outside perimeter of the compliant member 120 to pass through the valve 100. In view of the description provided herein, one of ordinary skill will recognize that a check valve, consistent with principles of the invention, can utilize a compliant member that has a portion that extends over the aperture to block fluid flow through the aperture.

In alternative embodiments, surfaces of the moveable member 125 and the first body portion 170 are rounded, smooth, textured, grooved, and/or have flat(s). As will be understood by one of ordinary skill, any suitable surface configurations may be used. Moreover, some alternative embodiments have lumen(s) defined within a first valve body portion, rather than relying solely or in part on the above-described space to permit the flow of fluid through the valve.

The check valve 100 has an opened state and a closed state. When in the opened state, the valve 100 allows fluid to flow through the pathway defined by the valve 100. When in the closed state, the valve 100 impedes fluid from flowing through the pathway, and thus further through components connected to the valve 100.

In association with the variable valve state, the moveable member 125 is slidably disposed within the first valve body portion 170. In association with the moveable member 125, the compliant member 120 moves toward or away from the valve seat 110.

FIG. 1a illustrates the valve 100 when in an opened state, in which the compliant member 120 is spaced from the valve seat. In contrast, a closed state of the valve 100 is associated with contact between the compliant member 120 and the valve seat 110. When the valve 100 is in the closed state, the compliant member 120 in combination with the moveable member 125 impede flow of fluid through the orifice.

A fluid entering the upper port of the check valve 100 tends to urge the moveable member 125 toward the valve seat 110 until the compliant member 120 contacts the valve seat 110. The compliant member 120 then blocks the flow from reaching the orifice in the valve seat 110. The valve 110 is now in the closed state.

When the fluid flow direction is reversed, the differential pressure inlet-to-outlet tends to push the moveable member 125 away from the valve seat. Once the compliant member 120 is spaced from the valve seat 110, the flow of fluid is able to pass through the valve 100, from the lower port to the upper port. As described above, when in the opened state, fluid flows through the valve 100 via a space between the moveable member 125 and the first body portion 170.

The moveable member 125 and the first body portion 170 are preferably dimensioned to provide lateral float of the moveable member 125, that is, side-to-side movement, within the first body portion 170. Lateral float permits the contact area to change location between contact events.

The compliant member 120 has an elastic property that permits it to recoverably deform when in contact with the valve seat to reproducibly provide a suitable fluidic seal. Moreover, the compliant member 120 deforms to provide a seal in spite of at least some particle(s) lodging between the compliant member 120 and the valve seat 110. Particles having a dimension greater than some threshold size—such as a smallest dimension of the contact interface between the compliant member 120 and the valve seat 110—will tend to cause leakage by spanning the interface.

The compliant member 120 has a toroidal configuration with a circular cross section. Some alternative cross sections include square, rectangular, polygonal or other suitable sectional shape. In alternative embodiments, a compliant member has alternative configurations, for example, square, rectangular, or a more general shape. In some embodiments, the aperture defined by a compliant member is spanned partially or completely by the compliant member (where, respectively, the compliant member does or does not have an opening.) For example, in one embodiment in which the aperture is completely spanned, a raised portion of a diaphragm-like compliant member defines a circular or other shape for contacting a valve seat. Moreover, a compliant member may include two or more component parts attached to one another. As will be understood by one of ordinary skill, a compliant member may be, for example, an O-ring or a gasket.

At least a portion of the compliant member 120 includes a suitable compliant material(s), including, for example, a known compliant material. For example, an O-ring is suitably made from, for example, nitrile, silicone, fluorocarbon, fluorosilicone, ethylene propylene, neoprene, or polyurethane. In some embodiments, a compliant material is chosen for biocompatibility and/or high-pressure performance such as a pressure of about 1 kpsi to about 2 kpsi, up to about 10 kpsi to about 15 kpsi, or higher (i.e., about 7 megaPascals to about 14 megaPascals, up to about 70 megaPascals to about 100 megaPascals, or higher.) Some materials that are suitable for high-pressure applications include, for example, PEEK polymer (available from Victrex PLC, Lancashire, United Kingdom) and polyimide.

As mentioned above, the check valve 100 optionally includes a filter unit 140. The filter unit 140 is included, for example, to reduce the number of particles having a sufficient size to cause leakage when such particles lodge between the compliant member 120 and the valve seat 110. The filter unit 140 is porous to the flow of fluid, but partially removes undissolved solid materials from the fluid.

The filter unit 140 supports proper functioning of the compliant member 120, such as an O-ring, that provides a contact interface having a relatively long dimension and a relatively narrow dimension. The filter unit 140 is configured, for example, to substantially remove particles having a size comparable to or greater than the narrow dimension of the contact interface.

The filter unit 140 includes any suitable filter, including known filters, such as commercially available filters used in chromatographic instruments. The filter unit 140 thus includes, in some embodiments, a material(s) having a pore size associated with removal of the undesirable particles. In some embodiments, the filter unit 140 is a frit-type filter or includes a screen.

Some suitable frit-type filters have the following features. A frit, in some embodiments, is formed from a sintered ceramic and/or a glassy material, or from a polymeric material, such as a porous high density polyethylene.

In one embodiment, the filter unit 140 includes a circular screen that is coated on bottom and/or top surfaces with a polymeric material, such as a fluorocarbon polymer or other relatively chemically inert material. The coating is configured to leave a central area of the screen open for fluid passage. The polymeric coating forms a ring of material that supports reliable sealing when the filter unit 140 is placed in a fluidic port of a valve of the invention.

The screen is fabricated from, for example, a stainless-steel screen. Such a screen is configurable, for example, to trap particles as small as approximately 2 micrometers or smaller. The screen has, for example, a thickness of between about 90 micrometers and about 140 micrometers. The filter unit 140 is fabricated by, for example, stamping a section of the stainless steel screen to provide a desired shape. In an alternative embodiment, a sintered stainless-steel frit is used.

Some alternative embodiments of a check valve include two or more filters. For example, the check valve 100 can be implemented with one or more filters located in each fluidic port.

The valve 100 has applications in fluid handling, processing, and analysis systems, among other uses. For example, in some embodiments, one or more check valves 100 are used in combination with one or more solvent pumps to deliver solvent of a desired concentration in a chromatographic instrument. In one application, check valves 100 are disposed in inlet and outlet ports of a piston-based pump to control the direction of fluid flow through the pump.

The valve seat 110, compliant member 120, and filter 140 are disposed with respect to one another in any suitable manner, for example, in a manner similar to existing ball-and-seat check valves. For example, as illustrated, the valve 100 optionally includes a valve body 170 within which the compliant member 120 moves to provide a closed state of the valve 100 when in contact with the valve seat 110, and to provide an open state when spaced from the valve seat 110. In some alternative embodiments of the invention, the valve seat 110 alone, or in combination with the compliant member 120, moves to provide the closed and opened states.

One of ordinary skill will recognize that the example of FIG. 1a functions as a passive valve. It will be apparent, however, that various modifications and/or additional components are includable to provide alternative designs, some of which entail active opening and/or closing of the valve. One illustrative example of an active valve is described below with reference to FIG. 3.

As described next, the above-described embodiment provides advantages over some prior valves, such as some prior valve designs that attempt to mitigate problems associated with particulate contamination. Particulate contamination typically has a pronounced deleterious effect on the performance of conventional ball-and-seat check valves because the sealing interface of the valve is generated between two substantially rigid surfaces. There is no meaningful ability of either the ball or the seat to temporarily conform around a foreign particle, with the result that the check valve can be blocked open while the foreign matter is present on the sealing interface. When the valve is blocked open by foreign matter, there is substantially no differential pressure impressed across the valve, and therefore substantially no hydraulic energization available which might tend to either crush or displace the foreign matter.

One prior approach to mitigate this problem entails a valve having a spring-loaded stainless steel poppet. In this approach, an elevated annular ridge, having a v-shaped cross-section, protrudes from the bottom surface of the poppet. The opposing surface, i.e., the valve seat, is made from a substantially chemically inert fluoropolymer such as polytetrafluoroethylene or PTFE. The elevated annular element of the stainless steel poppet is intended to embed partially into the fluoropolymer seat to provide a seal when the valve is in the closed state. The provision of a sealing surface material of significantly lower hardness than the stainless steel poppet is intended to allow small particulates to migrate through the valve without causing catastrophic loss of sealing ability. While in transit through the valve, the particles may temporarily embed within the softer material, and thus not corrupt the overall geometry of the sealing interface, as would occur with a substantially rigid ball-and-seat valve.

A negative attribute of the just-described valve is that the displacement of the poppet into the seat on a cycle-by-cycle basis presents a compliance under conditions of hydraulic loading where a high differential pressure exists across the valve. Just as back-leakage is undesirable in a chromatography pump check valve, excessive compliance is undesirable because it also corrupts the relationship between a control input (such as a pump step-motor step rate or step count) and a volumetric delivery output of fluid to the downstream system. Compliance within the valve, in response to a differential pressure impressed across the valve, appears superficially similar to solvent compression in that it results in a defect in the volume of solvent delivered in response to a defined displacement of the pump piston. The magnitude of the defect will typically be related to the operating pressure, and that relationship may differ in detail from the relationship associated with the compression of solvent. A second attribute of the above design is that the penetration of the elevated annular v-shaped ridge of the poppet into the relatively soft fluoropolymer seat involves some amount of shearing motion, which can itself lead to the generation of particulates and to a reduced valve cycle lifetime.

Another prior approach is directed to a modified ball rather than a modified seat, and is described in U.S. Pat. No. 4,681,139 to Falconer. In this approach, a relatively low pressure ball-and-seat type check valve utilizes an elastomeric ball to accommodate particulate contamination.

Unfortunately, a check valve in which one or both members of a ball-and-seat sealing pair are implemented fully in an elastomeric material potentially leads to excessive compliance if such a valve were to be used with a high-pressure chromatography pump. In the presence of high hydraulic loading, as encountered, for example, in high-performance liquid chromatography (HPLC), the compliance of an elastomer ball, for example, could be so great that the ball would become deformed into the sealing cone of the seat and remain lodged there.

Figure 2:
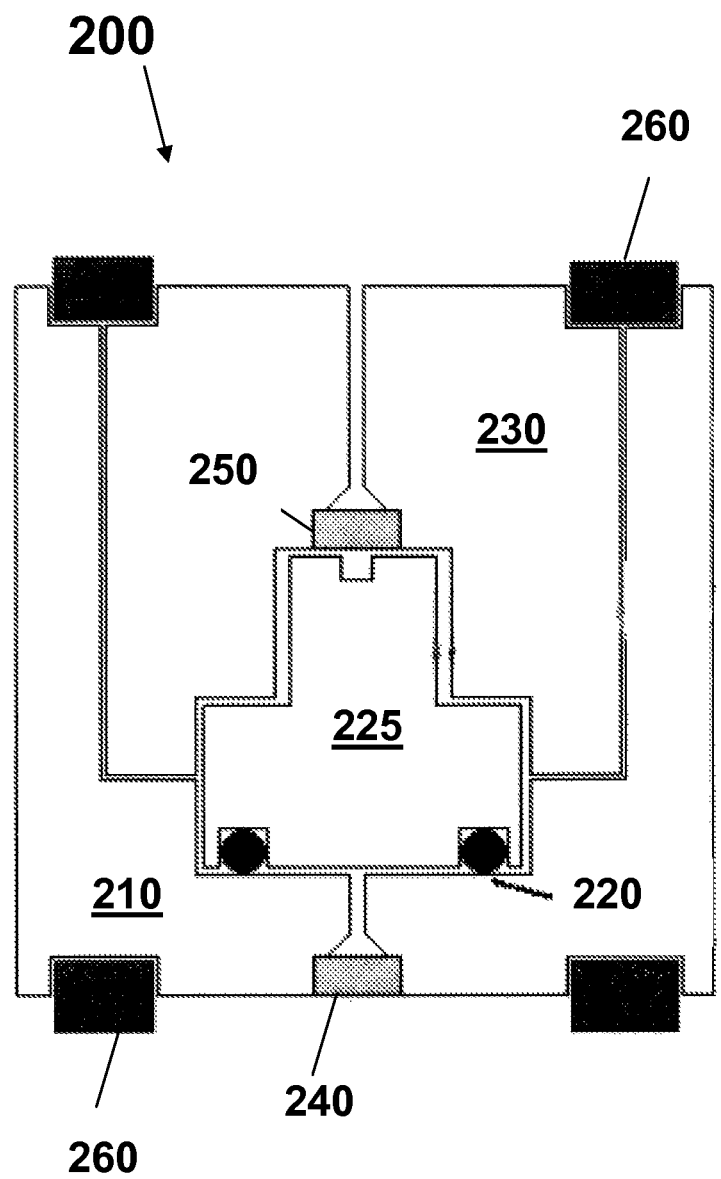
FIG. 2 is a cross-sectional diagram of a check valve, in accordance with one embodiment of the invention.

Now referring to FIG. 2, some check valves, in accordance with some embodiments of the invention, are cartridge-type check valves. Some of these embodiments are configured to mate with a valve housing that is, in turn, connected to other fluidic components, such as tubing and pumps. As known to one of ordinary skill, cartridge valves are often used to ease valve replacement.

FIG. 2 is a cross-sectional diagram of a cartridge check valve 200, in accordance with one embodiment of the invention. The valve 200 includes an O-ring 220, a moveable member 225 on which the O-ring 220 is mounted, a first valve body 210, a second valve body 230, two filter units 240, 250, and two external sealing members 260. A portion of the first valve body 210 serves as a valve seat that defines an orifice through which fluid flows when the valve 200 is in an opened state. The O-ring 220 is moveable to contact or to be spaced from the valve seat.

The first and second valve bodies 210, 230 define an interior space within which the moveable member 225 is disposed. Fluid flowing between inlet and outlet ports of the valve 200 passes through an interfacial space located between the moveable member 225 and the first and second valve bodies 210, 230.

The filter units 240, 250 are secured in the fluidic pathway of the valve 200, respectively adjacent to the inlet and outlet ports, by press fitting or any other suitable method. The filter units 240, 250 filter fluid flowing into and out of the valve 200 via the ports.

The cartridge valve 200 is configured to mate with a cartridge housing. The valve 200, in various alternative implementations, is provided with dimensions that provide compatibility with any suitable housing, including known housings, such as commercially available cartridge check-valve housings. In such cases, the check valve 200 is usable in place of a convention ball-and-seat cartridge check valve. As one example, the valve 200 is usable in combination with check valve housings connected to inlets and/or outlets of commercially available solvent pumps in chromatographic systems.

The dimensions of the first and second valve bodies 210, 230 are selected from any suitable dimensions. For example, the dimensions are selected to provide a cartridge that is compatible as a substitute for commercially available cartridges having, for example, ball sizes of 1/32", 1/16", 1/8", or 3/16".

The two external sealing members 260 are disposed on exterior portions of the valve 200 to provide fluidic seals in cooperation with a valve housing when the valve 200 is disposed in the housing. The external sealing members 260 are any suitable type of sealing member, including known members, such as gaskets or O-rings. For example, for good biocompatibility, gaskets are fabricated from PEEK polymer (available from Victrex PLC, Lancashire, United Kingdom.)

Some alternative embodiments of valves include resilient members, such as springs, and/or include weights and/or other components to urge a compliant member toward and/or away from a valve seat. As will be understood by one having ordinary skill, such passive components are utilized, for example, to provide a normally open or normally closed state and/or to establish a threshold level of differential fluid pressure required to transition the state of a valve.

Figure 3:
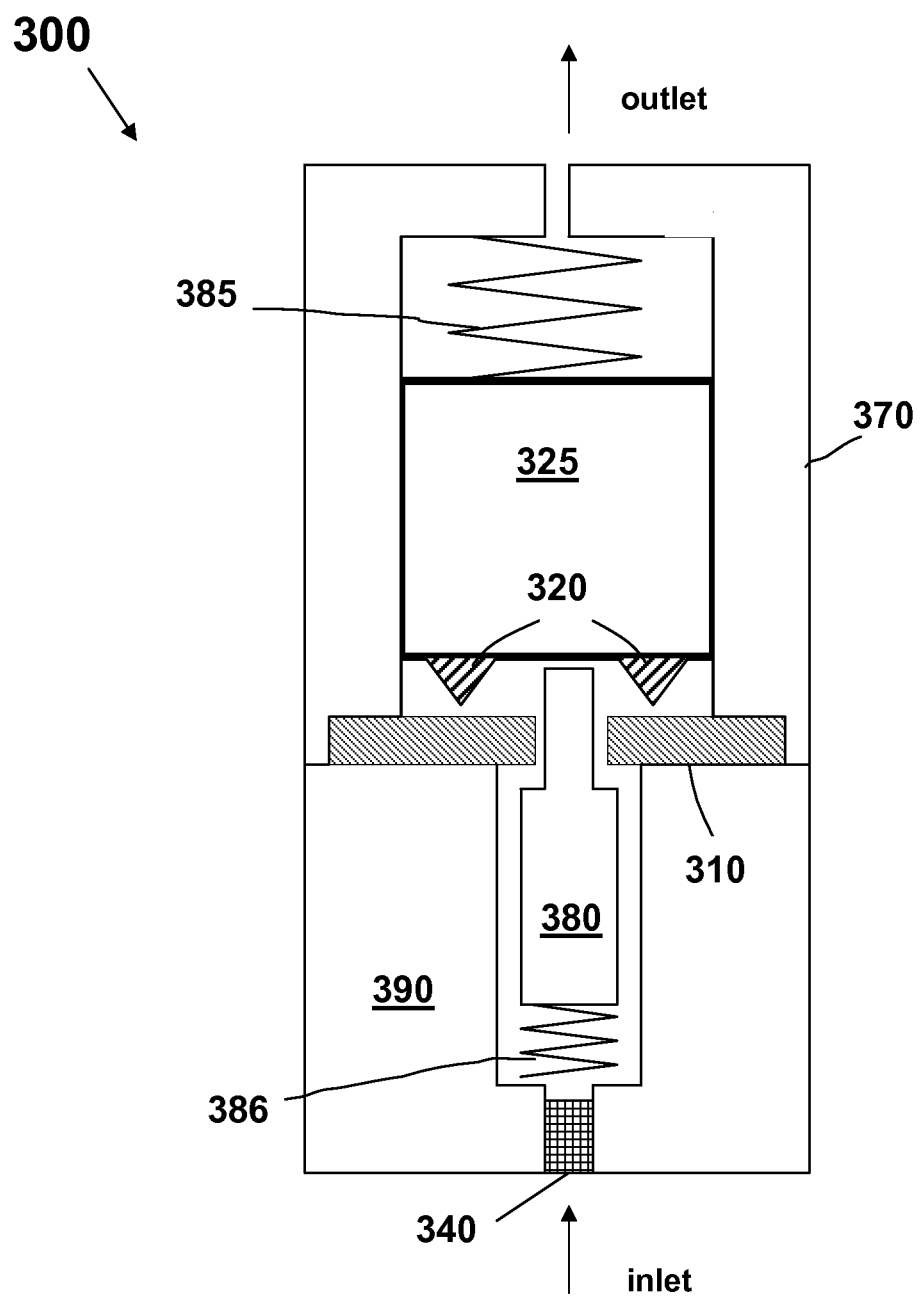
FIG. 3 is a cross-sectional diagram of a check valve, in accordance with one embodiment of the invention.

Next referring to FIG. 3, some valves, according to some embodiments of the invention, are active check valves. Some of these embodiments include active components, such as a solenoid, that drive valve-state transitions (i.e., from opened to closed and/or from closed to opened) in place of or in combination with passive means (such as the above-mentioned springs, weights, and differential fluid pressure.) One example of an active check valve is described next. One having ordinary skill will understand that this is merely an example, and does not limit embodiments of the invention to any single collection of components.

FIG. 3 is a cross-sectional diagram of an active check valve 300, in accordance with one embodiment of the invention. The valve 300 includes a valve seat 310, a compliant member 320, a poppet 325 on which the compliant member 320 is mounted, a first valve body portion 370 defining an outlet port, a second valve body portion 390 defining an inlet port, a first spring 385, a second spring 386, an actuating member 380 to change a position of the poppet 325 relative to the valve seat 310, and a filter 340 disposed in the pathway of the inlet port.

The filter 340 removes some of the particulate material in fluid passing into the valve 300 through the inlet port. The valve seat 310 defines an orifice through which fluid flowing through the valve 300 must pass. When the valve 300 is in a closed state, fluid attempting to flow through the orifice is impeded by the compliant member 320 and the poppet 325.

As illustrated, the compliant member 320 defines a central aperture and has a non-round cross section. In place of the illustrated compliant member 320, the valve 300 alternatively utilizes an O-ring or other suitable compliant member, such as those described with reference to the valves 100, 200. For example, in one alternative embodiment, a compliant member includes a portion of material that fully spans a central aperture defined by the compliant member. Thus, in some embodiments of valves, in accordance with the invention, a compliant member need not rely on a moveable member or related component to impede a flow of fluid past the compliant member.

The first spring 385 is configured to urge the poppet 325 either toward or away from the valve seat 310, as desired. For example, the valve 300 is configured to have a normally opened or normally closed state. In one implementation of the valve 300, a normally closed state is provided by configuring the first spring 385 to urge the poppet 325 toward the valve seat 310. Similarly, in another implementation, a normally opened state is provided by configuring the first spring 385 to urge the poppet 325 away from the valve seat 310. The word "normally" is used herein, depending on context, to refer to a state of the valve 300 obtained when no force is applied by a fluid or by the actuating member 380 to the poppet 325.

In some implementations, the spring 385 is replaced by a weight that relies on gravitational forces to urge the moveable member 325 toward the valve seat 310. Alternatively, the weights of the moveable member 325 and/or the compliant member 320 are usable to passively urge the poppet 325 toward the valve seat 310. For example, the first spring 385 is replaced by a weight, in one embodiment, to passively provide a normally closed state for a valve.

The second spring 386 is configured to urge the actuating member 380 either toward or away from the poppet 325, as desired. In some implementations of the valve 300, the springs 385, 386 are configured to work in cooperation to provide a normally closed state or a normally opened state. As will be recognized by one of ordinary skill, selection of the specific configurations of the springs 385, 386 will determine a force required to displace a position of the poppet 325. For example, in one embodiment, the second spring 386 is configured to provide a normally open valve 300 by pushing the actuating member 380 against the poppet 325 and thus pushing the poppet 325 away from the valve seat 310. Moreover, in one embodiment, the valve 300 is implemented without a second spring 386, and provides a normally closed valve 300.

Some alternative embodiments of a valve include fewer than two springs or more than two springs, and/or utilize alternative locations for springs. For example, some embodiments position a poppet within a spring and/or position an actuating member within a spring.

Active-control related features of the valve 300 are described next. To support active control of the state of the valve 300, the second valve-body portion 390 includes means for generating a magnetic field. Any suitable means may be used, for example, an electrically conductive coil (such as a solenoid.) In the remaining description, it is assumed that the generating means includes a coil, however, one of ordinary skill will recognize that other generating means may be used.

The coil is energized with an electrical current to induce a magnetic field in the vicinity of the actuating member 380. The orientation of the magnetic field is reversible by reversing the direction of the electrical current flowing through the coil.

The actuating member 380 mediates active control of the position of the poppet 325 in response to the induced magnetic field. To provide this response, the actuating member 380 includes a magnetic material, such as a hard and/or a soft magnetic material. The magnetic field pulls or pushes the actuating member 380, depending on the particular composition and configuration of the magnetic material and the coil. As will be understood by one having ordinary skill, the actuating member 380 is herein also referable to as, for example, a "pin," "armature," "actuating element," "rod," or similar term.

For example, in one alternative embodiment, the actuating member 380 includes an encapsulated soft magnetic material, such as iron. In this case, turning on the magnetic field causes the actuating member 380 to be pulled toward the coil, and thus away from the poppet 325.

As another alternative, the actuating member 380 is formed of an encapsulated permanent magnetic material, such as a ferrite. The permanent magnetic material is pushed away from or pulled into the coil in response to the polar orientation of the magnetic field relative to the polar orientation of the magnetic material. The polar orientation of the coil's magnetic field is determined by the switchable direction of current flowing through the coil. Thus, in this example, the actuating member 380 is pulled away from the poppet 325 for one direction of current flow, and pushed toward the poppet for the other direction of current flow. This arrangement permits the valve 300 to be actively opened by causing the actuating member 380 to push the poppet 325 away from the valve seat 310.

When the valve 300 is in an opened state, fluid is permitted to pass through the valve 300 by flowing first though the filter 340, around the actuating member 380, past the compliant member 320, around the poppet 325, past the spring 385, and finally through the outlet port. One of ordinary skill will recognize, however, that the actuating member 380, in principle, is usable to force the valve 300 into an opened state to permit fluid flow in an opposite direction.

In another alternative embodiment, similar to the valve 300, an actuating member is attached to a poppet or the actuating member and poppet are integrally formed from the same piece of material. In this embodiment, the actuating member can both push the poppet away from a valve seat and pull the poppet towards the valve seat. Thus, some embodiments provide both active opening of the valve and active closing of the valve.

In some other alternative embodiments, similar to the valve 300, the locations of magnets and coils are swapped. That is, for example, an active valve armature includes a coil, such as a voice coil, while a second body portion includes an electromagnet or permanent magnet. As will be understood by one of ordinary skill, the movement of such an armature is controlled by application of a current to the coil portion of the armature. Some embodiments that employ a voice coil provide both a force magnitude and direction that is controllable via control of the coil current. These embodiments thus provide a push-pull valve.

In still other embodiments, a poppet includes a magnet or a coil, and active closing and/or opening is implemented with or without use of an actuating member. Alternative valves, in accordance with some embodiments of the invention, utilize any suitable active switching feature(s) other than or in addition to the above-described magnetic-related switching features.

Some embodiments of the invention have advantages over traditional ball-and-seat check valves. For example, the actuating member 380 decouples the compliant member 320 from the valve seat 310 by contacting the moveable member 325; the actuating member thus need not have direct contact with the compliant member 320. Moreover, the poppet 325 and compliant member 320 have a selectable degree of lateral float. For example, the compliant member 320 need not contact the same portion of the valve seat 310 during repeated contacts with the valve seat 310.

Some alternative embodiments of valves include an actuating member disposed to contact the moveable member to the side of the compliant member. Still other embodiments include an actuating member disposed such that the moveable member is between the actuating member and the valve seat (e.g., with reference of FIG. 3, disposed above an actuating member.)

Numerous embodiments of the invention, including the above-described valves 100, 200, 300, support priming of pumps. For example, a valve 100, 200, 300 can provide a check valve for an output port of a piston-based solvent pump of a chromatographic instrument. During priming of such a pump, the check valve seals the output port of the pump so that solvent is drawn into the pump from a solvent source. The valve provides a good seal even if dry, in contrast to some ball-and-seat based check valves. In contrast to these ball-and-seat based check valves, wetted surfaces are not required to obtain a good seal between a compliant sealing member and its associated valve seat.

Figure 4:
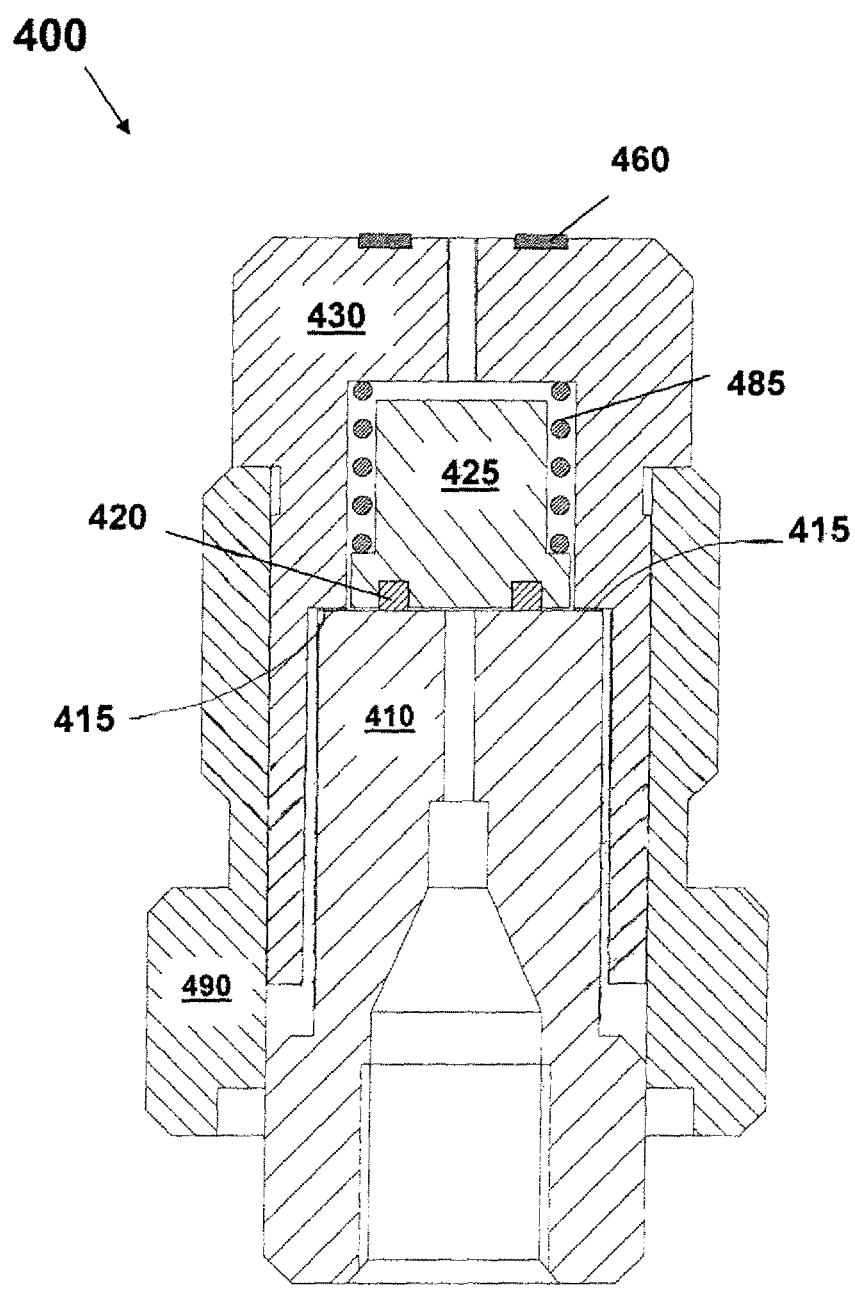
FIG. 4 is a cross-sectional diagram of a check valve, in accordance with one embodiment of the invention.

Now referring to FIG. 4, another example of a check valve is described. FIG. 4 is a cross-sectional diagram of a check valve 400, in accordance with one embodiment of the invention. The valve 400 includes a compliant seal 420, such as an O-ring, a poppet 425 on which the compliant seal 420 is mounted, a spring 485 disposed around the moveable poppet 425, a first valve body 410, a second valve body 430, a sealing member 415, a shell nut 490, and an external sealing member 460. A portion of the first valve body 410 serves as a valve seat that defines an orifice through which fluid flows when the valve 400 is in an opened state. The compliant seal 420 moves with the poppet 425 to contact or to be spaced from the valve seat of the first valve body 410.

The first and second valve bodies 410, 430 define an interior space within which the poppet 425 and spring 485 are disposed. Fluid flowing between inlet and outlet ports of the valve 400 passes through an interfacial space located between the poppet 425 and the first and second valve bodies 410, 430. The spring 485 is disposed in the interfacial space, and is configured to urge the poppet 425 toward the valve seat of the first valve body 410.

The sealing member 415 is disposed between the a first valve body 410 and the second valve body 430. The sealing member 415 is any suitable sealing member, such as a gasket. In one alternative, the first valve body 410 threadably engages the second valve body 430. The bodies 410, 430 optionally load the sealing member to provide an adequate seal.

In some alternative configurations, the check valve 400 is usable in place of a convention ball-and-seat check valve. The valve 400 is configured, for example, to engage an internally-threaded counterbore in a pump cylinder or manifold. The valve 400, in various alternative implementations, is configured to provide compatibility with any component of interest. In some alternative embodiments to that of the valve 400, a valve is configured as a cartridge-type valve; such a valve is usable, for example, in combination with check valve housings connected to inlets and/or outlets of commercially available solvent pumps in chromatographic systems.

The external sealing member 460 is disposed on an end portion of the second valve body 430 to provide a fluidic seal in cooperation with, for example, the base of a counterbore into which the valve 400 is installed. The external sealing member 460 is any suitable type of sealing member, including known members, such as gaskets or O-rings.

Variations, modifications, and other implementations of what is described herein will occur to those of ordinary skill in the art without departing from the spirit and the scope of the invention as claimed. For example, in some embodiments a moveable valve seat moves relative to a fixed compliant member. Alternatively, in some embodiments both the valve seat and the compliant member are moveable. Some embodiments include more than one compliant member and/or more than one valve seat. In some embodiments, a valve seat comprises a metal having a yield strength of greater than about 50 kpsi. In such embodiments, the valve seat optionally has a machine-finished surface. Accordingly, the invention is to be defined not by the preceding illustrative description but instead by the spirit and scope of the following claims.

What is claimed is:

1. A check valve for a chromatography solvent pump, the check valve comprising:
   a valve seat defining an orifice;
   a member that is moveable between at least two positions that respectively provide at least a closed state and an opened state of the check valve;
   a compliant member mounted on the moveable member, and contacting the valve seat, if the valve is in the closed state, to impede a fluid from flowing through the orifice, and being spaced from the valve seat, if the valve is in the opened state, to permit the fluid to flow through the orifice,
   wherein a contact area of the compliant member and the valve seat defines an aperture that surrounds the orifice of the valve seat; and
   a voice coil attached to the moveable member that alternately urges the moveable member toward and away from the valve seat.

2. The check valve of claim 1, further comprising a valve body defining a cavity within which the moveable member laterally floats if the valve is in the opened state.

3. The check valve of claim 1, wherein the compliant member comprises a gasket or an O-ring.

4. The check valve of claim 1, wherein the valve seat has a substantially flat surface for contacting the compliant member.

5. The check valve of claim 1, wherein the valve seat comprises a metal having a yield strength of greater than about 50 kpsi.

6. The check valve of claim 5, wherein the valve seat has a machine-finished surface.

7. The check valve of claim 1, wherein the compliant member has a non-linear elastic property.

8. The check valve of claim 1, further comprising an actuator moveably disposed adjacent to the compliant member to urge the compliant member away from the valve seat in response to an actuation signal to actively transition the check valve from the closed state to the opened state.

9. The check valve of claim 8, wherein the actuator is fixedly attached to the moveable member or contacts the moveable member in response to the actuation signal.

10. The check valve of claim 9, wherein the actuator is fixedly attached to the moveable member to urge the compliant member toward the valve seat in response to a second actuation signal to actively transition the check valve from the opened state to the closed state.

11. The check valve of claim 1, further comprising an actuator moveably disposed adjacent to the compliant member to urge the compliant member toward the valve seat in response to an actuation signal to actively transition the check valve from the opened state to the closed state.

12. The check valve of claim 1, further comprising a resilient member that passively urges the compliant member towards or away from the valve seat.

13. The check valve of claim 1, further comprising a valve body within which the moveable member is entirely disposed.

14. The check valve of claim 1, wherein the check valve is a cartridge-type check valve configured for replaceable disposition within a valve housing.

15. The check valve of claim 1, further comprising a filter unit configured to at least partially remove, from the fluid, particles having a size sufficient to bridge the contact interface between the valve seat and the compliant member causing leakage of the fluid if the valve is in the closed state.

16. The check valve of claim 15, wherein the filter unit comprises a frit.

* * * * *